(12) United States Patent
Horstman et al.

(10) Patent No.: US 7,519,161 B2
(45) Date of Patent: Apr. 14, 2009

(54) SYSTEM AND METHOD FOR NORMALIZATION AND CALIBRATION OF AN IMAGING SYSTEM USING A VARIABLE THICKNESS FILTER

(75) Inventors: Steven Jon Horstman, San Diego, CA (US); William M. Fries, San Diego, CA (US); William Adams Heindl, San Diego, CA (US)

(73) Assignee: Science Applications International Corporation, San Diego, CA (US)

( * ) Notice: Subject to any disclaimer, the term of this patent is extended or adjusted under 35 U.S.C. 154(b) by 69 days.

(21) Appl. No.: 11/723,107

(22) Filed: Mar. 16, 2007

(65) Prior Publication Data

US 2008/0226037 A1    Sep. 18, 2008

(51) Int. Cl.
    G21K 1/04    (2006.01)
(52) U.S. Cl. ...................................... 378/150
(58) Field of Classification Search ............ 378/57, 378/145, 147, 150–153, 156–159, 207
    See application file for complete search history.

(56) References Cited

U.S. PATENT DOCUMENTS

| | | | |
|---|---|---|---|
| 5,668,847 A | 9/1997 | Hernandez | 378/65 |
| 5,771,272 A | 6/1998 | Berger et al. | 378/207 |
| 6,389,108 B1 | 5/2002 | Ein-Gal | 378/147 |
| 7,336,768 B2 * | 2/2008 | Ogawa | 378/156 |

OTHER PUBLICATIONS

International Search Report and Written Opinion for Application No. PCT/US07/06623, dated Feb. 7, 2008 (mailing date).

* cited by examiner

*Primary Examiner*—Courtney Thomas
(74) *Attorney, Agent, or Firm*—King & Spalding LLP

(57) ABSTRACT

A system and method for calibrating a radiation imaging system include a dual use variable thickness radiation filter having a slit in one part thereof such that in a first position a radiation beam passing through is not attenuated and in a second position the radiation beam is attenuated according to the total filter thickness in the path of the radiation beam. The filter may be formed of multiple movable plates or a single piece of stepped high density material.

27 Claims, 5 Drawing Sheets

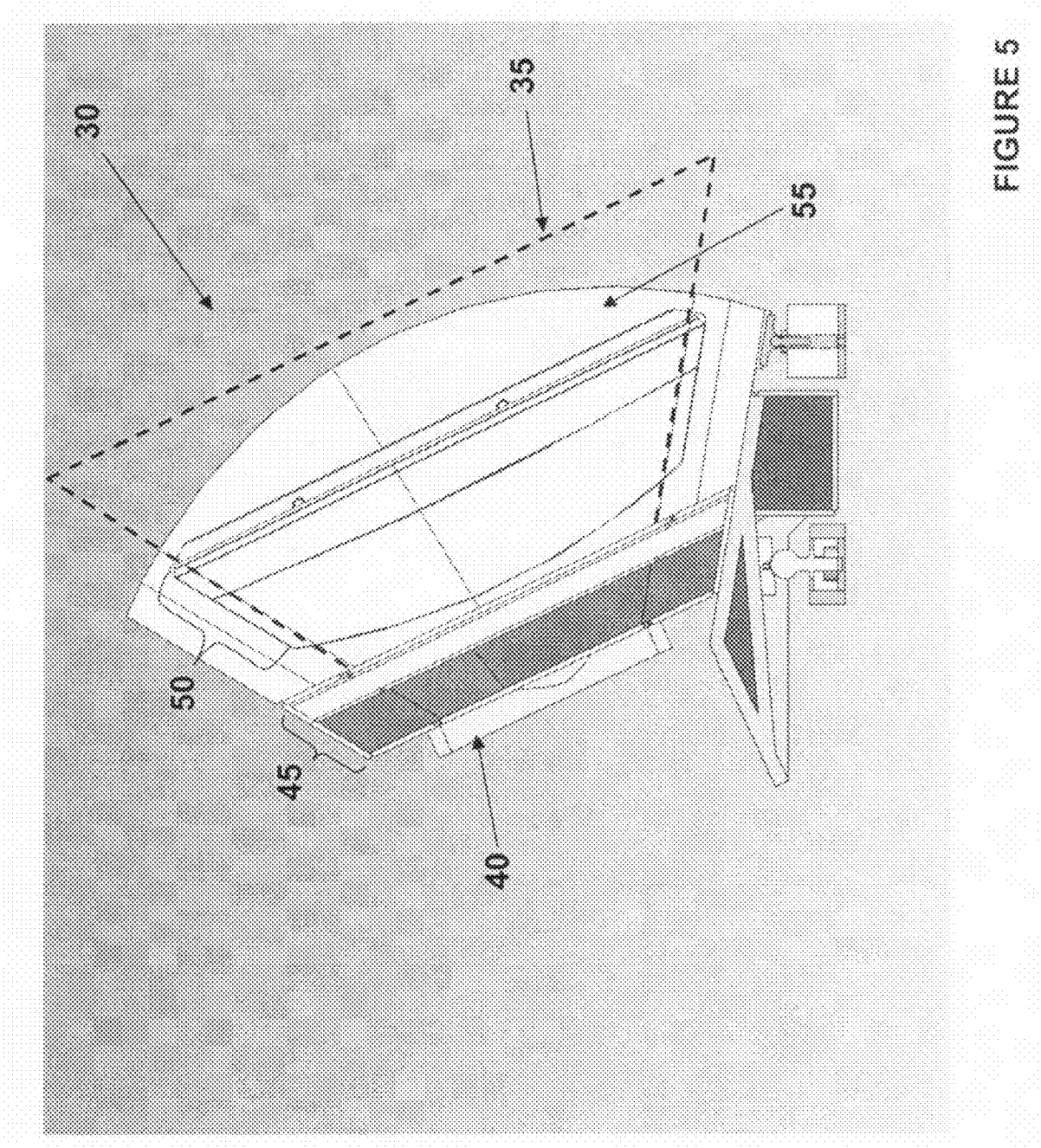

SYSTEM AND METHOD FOR NORMALIZATION AND CALIBRATION OF AN IMAGING SYSTEM USING A VARIABLE THICKNESS FILTER

BACKGROUND OF THE INVENTION

1. Field of the Invention

The invention relates generally to the fields of cargo screening, non-intrusive inspection (NII), non-destructive testing (NDT), and, more particularly, to systems and methods for calibrating such devices.

2. Description of the Related Art

Most currently available normalization filters for use with high energy imaging systems are referred to as "step wedge" devices. A step wedge is a single block of material which is cut into steps. Each step is a different thickness that may be placed into the radiation beam. To have many thicknesses one must have many steps. Since each step is in series the wedge is driven with a positioning system which can place each step in the beam. This requires a motion control capability. The step wedge does not perform any of the collimation functions necessary for operation of an imaging system and thus represents yet another component to the source assembly which adds bulk, weight and expense.

SUMMARY OF THE INVENTION

Summary of the Problem

In the NII and NDT art, the ultimate goal is to produce high quality images of the interior/contents of a target. It is known in the art to transmit a collimated electromagnetic radiation beam, e.g., x-ray or gamma, from a radiation source towards the target and collect the transmitted radiation after it has passed through the target at a detector array. The detected radiation can be used to infer line of sight density information about the target and its contents. Relative motion between the system and target is used to provide a multi-dimensional image. In order to produce an image which accurately represents the target's internal density distribution, it is necessary to calibrate the response of the detector array to the range of densities which may occur in the target and its contents. Such calibration is achieved by the prior art using a stepped block (or "step wedge") of solid material, e.g., steel, that is moved in and out of the beam of the radiation source while readings are taken at the detector array. The set of step thicknesses is generally chosen to cover the range of total densities that the system is capable of imaging. For example, a system intended for cargo container inspection may employ thicknesses ranging from ¼" of steel (typical container wall thickness), up to the maximum thickness of steel the system can inspect (e.g. 12"). When a target is scanned, the readings from the detector array are compared to the readings made of the step wedge in order to form an image based on the equivalent line of sight density of material in the target.

The prior art presents a problem since the solid, steel block represents an extra component that must be included with the radiation source configuration. This component adds weight to the configuration and increases the size thereof, thus requiring additional shielding around the source configuration and further encroaching into the imaging lane where even a single foot is significant at, e.g., ports and border crossings, which utilize multiple traffic imaging lanes. Use of a step wedge requires prediction of the best thicknesses for the steps and once chosen, the user is limited to those thicknesses for insertion in the beam. The prior art step wedge offers no flexibility.

Summary of the Solution

A first exemplary embodiment of the present invention describes a system for calibrating a radiation imaging device. The system includes: a variable thickness filter consisting of multiple movable plates for attenuating radiation and a radiation detector for measuring variations in the attenuated radiation.

A second exemplary embodiment of the present invention describes a method for calibrating an imaging device. The method includes: directing a radiation beam at a detector; passing the radiation through a variable thickness filter including multiple movable plates, the radiation remaining unattenuated when each of the multiple movable plates is in a first position; attenuating the radiation in one or more increments dependent on the total thickness of the multiple movable plates that are in a second position; and detecting the radiation at the detector.

A third exemplary embodiment of the present invention describes a system for calibrating a radiation imaging device. The system includes: a variable thickness filter including multiple steps and a slit through a thickest section of the variable thickness radiation filter and a radiation detector for measuring variations in radiation passing through the variable thickness filter.

BRIEF DESCRIPTION OF THE DRAWINGS

In the Figures:

FIG. 5 shows a side, partially cut-away view of a collimator subassembly and radiation beam according to an embodiment of the present invention.

DETAILED DESCRIPTION OF THE PREFERRED EMBODIMENTS OF THE INVENTION

Figure 1:
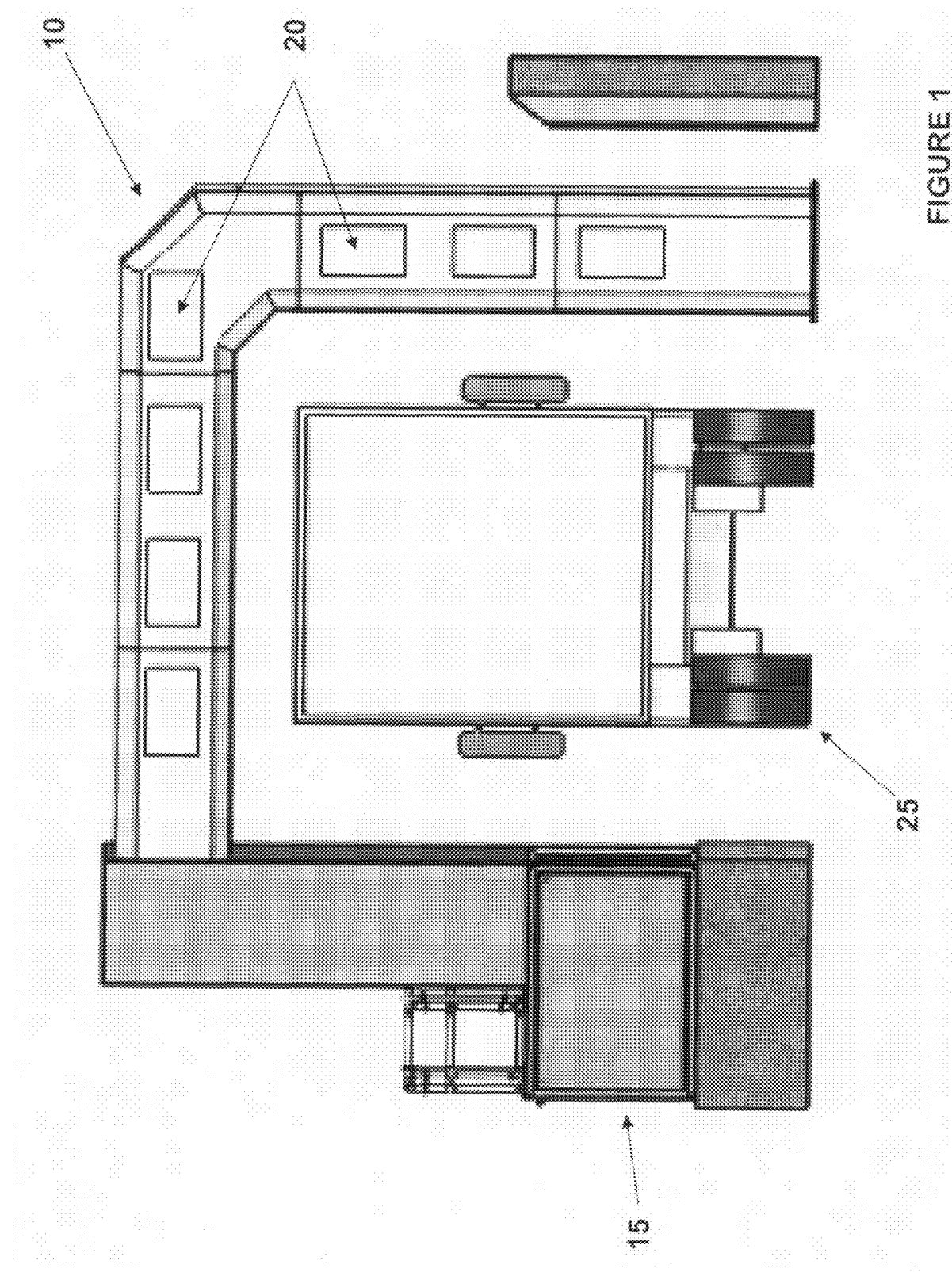
FIG. 1 shows an overall system design for implementing the preferred embodiments of the present invention within a transmission radiation imaging device.
Figure 2:
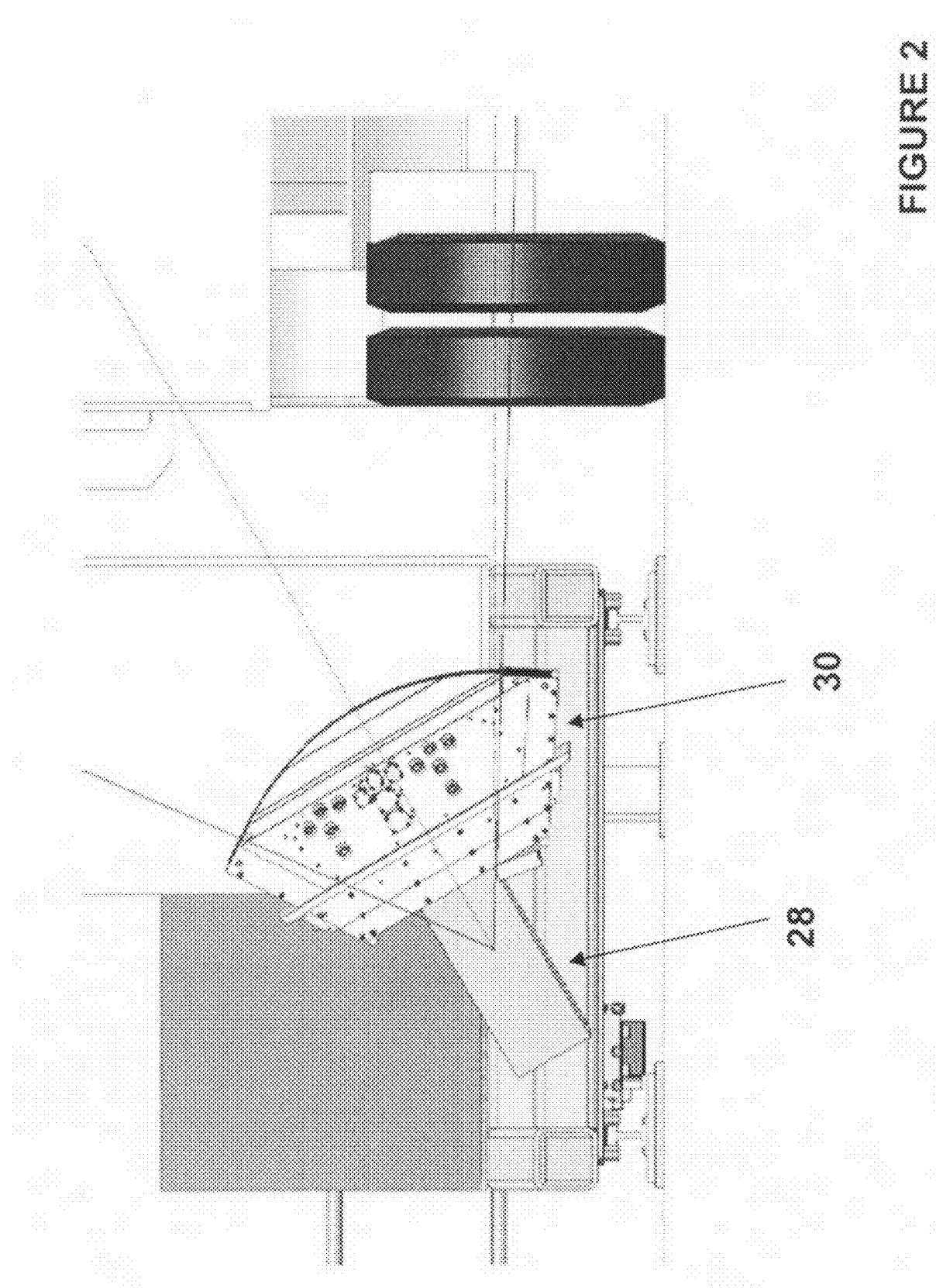
FIG. 2 shows the source subassembly according to an embodiment of the present invention.

The present invention is best described in the context of a larger device invention 10 for imaging the contents of a target, e.g., vehicle, shown in FIG. 1. The exemplary device 10 includes, among other components, a source assembly 15 and at least one detector 20 for measuring the intensity of radiation transmitted through the target 25. The source assembly 15 emits penetrating electromagnetic radiation, e.g., x-ray or gamma radiation. Included in source assembly 15 is a collimator subassembly 30 as shown in FIG. 2. The collimator subassembly 30 acts on x-ray or gamma radiation emitted from source 28. For example, in a particular embodiment, x-rays are generated by a betatron. Generally, the x-rays generated by the betatron result in a broad, cylindrically symmetric beam. The device 10 requires a narrow, fan-shaped beam of x-rays. Accordingly, the system utilizes a collimator, usually in the form of a slit, that shapes the beam. The slit is located in front of the x-ray source, e.g., betatron, as described further herein and creates a window that blocks the broad beam of x-rays except for those x-rays emitted in the desired pattern. The radiation is collected at detector 20 which, in a preferred embodiment, is an array of detectors. The larger device exemplified through FIG. 1 is but one system that may benefit from the invention described herein.

Those skilled in the art recognized that other portal, gantry, rail and mobile imaging systems may incorporate the invention.

Figure 3:
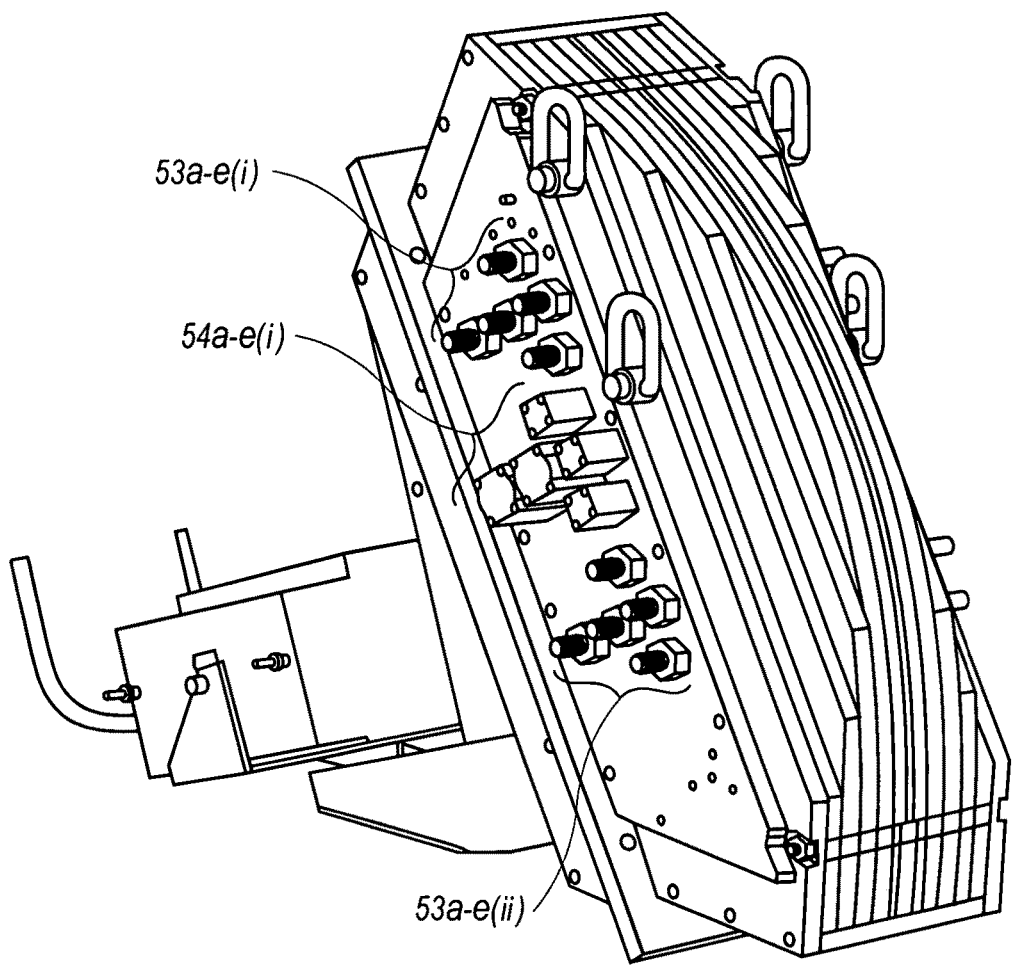
FIG. 3 shows a side view of the source subassembly according to an embodiment of the present invention.
Figure 4:
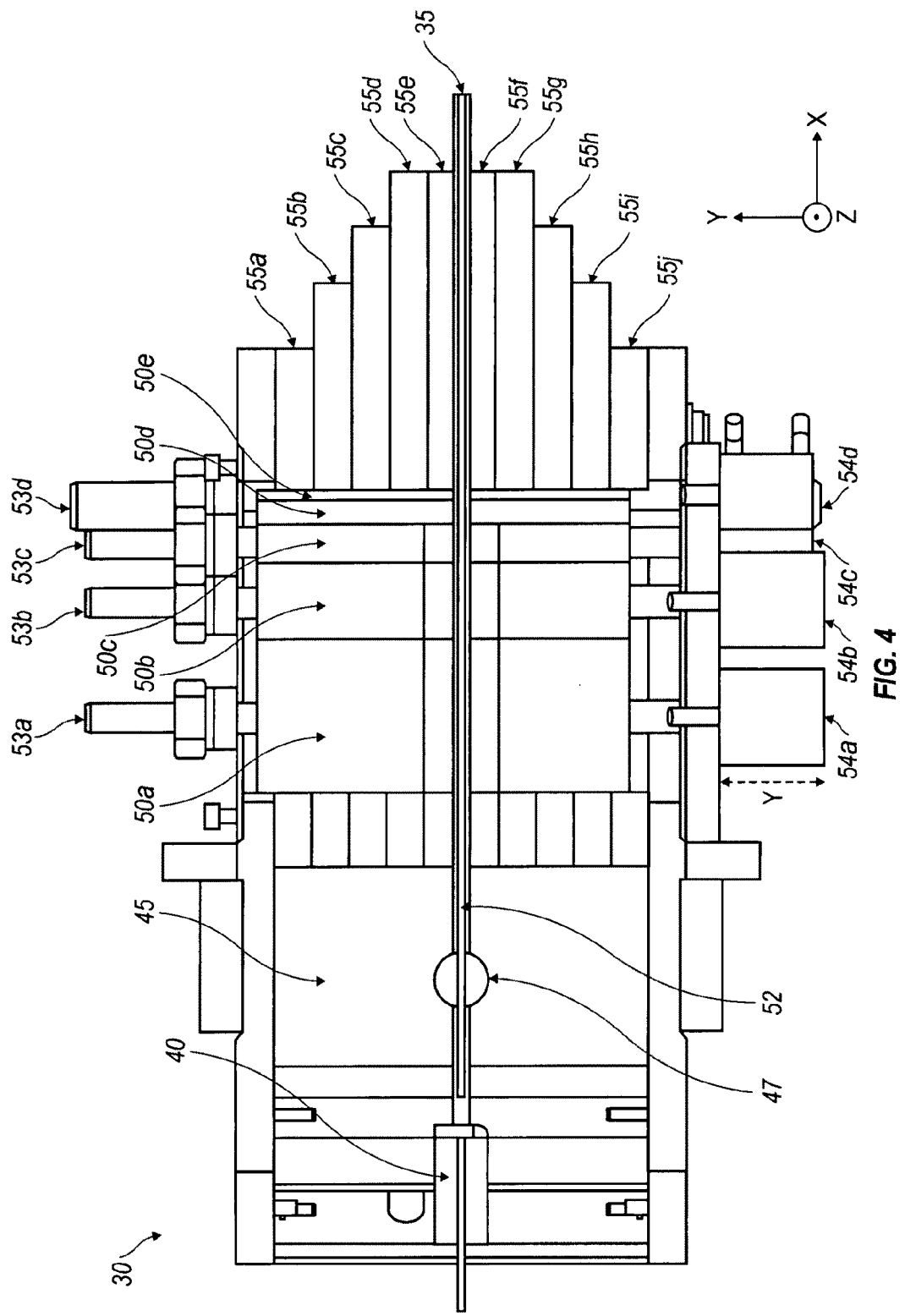
FIG. 4 shows a top, cut-away view collimator subassembly according to an embodiment of the present invention.

FIGS. 3 and 4 illustrate details of the collimator subassembly 30 according to a preferred embodiment of the present invention. Referring specifically to FIG. 4 (top view of subassembly), the collimator subassembly 30 includes the following principal components: beam flattening filter 40, primary collimator 45, beam monitoring device 47, secondary collimator 55 composed of parts 55a-55j, and normalization and calibration filter 50 composed of parts 50a-50e.

Beam flattening filter 40 is used to flatten the radiation beam. In general, the intensity of the radiation beam from an x-ray source is strongly peaked in the forward direction, decreasing strongly away from that direction. Furthermore, the intensity of the beam decreases with the distance from the source. The beam flattening filter 40 thickness is contoured to attenuate the radiation beam so that an approximately uniform radiation intensity is present on the full detector array 20. This is generally desirable for optimum performance of the device 10. The beam flattening filter 40 is formed of a suitable material such as copper or other appropriate materials known to those skilled in the art. Additionally, though shown in the exemplified embodiment as being located prior to the primary collimator 45 in the radiation beam path, the beam flattening filter may be located after the primary collimator 45 or, alternatively, co-located with the primary collimator 45.

The primary collimator 45 has a main function of providing first, coarse collimation of the broad source beam. It is in the form of a monolithic block or a block built of multiple plates having a slot through which the desired radiation may pass. The primary collimator is formed of a suitable material or combination of materials, such as copper and lead.

Located within the slit of the primary collimator is a beam monitoring detector 47. The beam monitoring detector 47 measures variability of the emitted radiation beam strength and is used to compensate signals measured in the detector array 20 for these variations. The detector 47 may be of the same or similar construction to the individual detectors comprising the detector array 20 of the overall device, e.g., plastic scintillator, NaI, or other detectors well known to those skilled in the art for the detection of x-rays or gamma radiation.

The final two major components of collimator subassembly 30 are co-located. A variable thickness normalization and calibration filter 50 is comprised of individual plates having a range of thicknesses of an appropriate material, e.g., copper. By way of example, five different filter plates 50a-50e are shown in FIG. 4 ranging in size from 4.0 inches to 0.25 inches in thickness. Each filter plate 50a-50e includes a slit 52 in the center thereof which can be co-located with the slits in all other major components of the collimator subassembly 30. When so aligned, the beam passes through the normalization and calibration filter 50 unimpeded. Alternatively, the thickness of each plate may be moved in and out of the radiation beam path by virtue of actuators. For example, the filter plates may be supported by bearing rods allowing the plates to slide when acted upon by e.g., pneumatic piston actuators. For example, actuator 54a moves filter plate 50a in and out of the radiation beam path in the direction Y supported by rods 53a(i-iv). Similarly, actuator 54b moves 50b and rods 53b(i-iv); actuator 54c moves 50c and rods 53c(i-iv); actuator 54d moves 50d and rods 53d(i-iv); and actuator 54e moves 50e and rods 53e(i-iv). A single actuator serves to move each filter plate in both directions. This is exemplified most readily in FIG. 3. Alternatively, there may be duplicate actuators on either side of the subassembly, one each to push the filter plate in opposite directions. Any combination of components known to those skilled in the art for positioning the filter plates between positions of calibration and collimation is contemplated. The combination of filter plates allows for variable thickness within the beam path ranging from 0.25 inches to 7.75 inches in 0.25 inch increments. This is but one exemplary configuration for the variable thickness normalization filter 50.

In alternative embodiments, the number and thicknesses of filter plates may be increased or decreased. In this way, the total thickness range and actual set of available thicknesses are appropriate to the performance range of the device. For example, an 8 inch filter could be added to the exemplary system to provide thicknesses from 0.25 inches to 15.75 inches if that were the maximum performance of the larger device. Said a different way, as the performance range of transmission imaging devices increases, the present invention contemplates additional or thicker filter plates to cover the increased range. Further, while the increments are exemplified as 0.25 inches, one skilled in the art recognizes that this is variable. Further still, referring to the directional grid on FIG. 4, the filter plates extend in the Z direction as well as the X direction like the radiation beam 35 which expands in a fan shape from its source along the Z axis (See FIG. 5). Accordingly, the filter plates 50a-50e could be modified in shape and thickness, in order to best perform the normalization function. For example, the filter plates could be in parabolic, radius or stepped thickness profiles. Optimization can also be achieved by varying the material comprising the filter plates, i.e., steel, copper, lead, aluminum etc.

A still further embodiment of the invention contemplates a filter plate or set of filter plates, each having three possible positions: an open position for collimation, a first calibration position wherein the filter plate portion in the beam path is comprised of a low or moderate atomic number material (e.g., copper), a second calibration position wherein the filter plate portion in the beam path is comprised of a high atomic number material (e.g., tungsten). This allows for calibration of imaging systems which offer the ability to image and identify materials by their atomic number. This embodiment further includes the possibility of filter plates having more than three positions comprising an open position and multiple different atomic number materials. This embodiment would be accompanied by a set of actuators, e.g. stepper motors, capable of positioning the filter plates in each of the multiple positions. Further still, the filter plates could provide for the same approximate attenuation when the filter plates are in different positions, depending on the thicknesses and material compositions of the plates in each position.

Co-located with the variable thickness normalization filter 50 is a secondary collimator 55 which produces the final shape of the radiation beam. The secondary collimator 55 is formed of a suitable material such as copper, steel, lead, tungsten or the like. In the embodiment shown, the secondary collimator 55 is formed of multiple stacked plates of approximately equal thickness 55a-55j. But the secondary collimator could be formed of a single, continuous block of material The co-location feature of the present invention allows for a more compact overall source subassembly, which in turn reduces the amount of massive shielding that is required for high energy radiation sources and allows the source to be placed closer to the target and detector array.

As some scattering of radiation results from the secondary collimator, a post-collimator or scatter trap (not shown) may also be incorporated as part of the source subassembly. The post-collimator incorporates an opening slit somewhat wider than the opening slit of the second collimator. The post-collimator slit is of sufficient width to trap scattered radiation from the exit of the secondary collimator, but not impinge on the collimating beam thereby becoming an additional source of scatter. The post-collimator is formed of a suitable material such as copper, lead, or tungsten.

Referring to FIG. 5, a partially cut-away side view of the collimator subassembly 30 is shown, illustrating a side view of the beam flattening filter 40, the primary collimator 45, variable thickness normalization filter 50, secondary collimator 55 and illustrating the path of the radiation fan beam 35.

As an alternative to the variable thickness normalization filter 50 described and shown in FIG. 4, the present invention also contemplates using a fixed step wedge filter having a slit through the thickest section, such that the wedge can be co-located with the remaining components during imaging.

Additionally, one skilled in the art appreciates that a combination of fixed step wedge and variable thickness filters as described above could be employed in a single collimator subassembly configuration depending on the needs and design specifications of the imaging system.

One skilled in the art recognizes the various implicit alternatives to the embodiments described herein that fall within the scope of the invention as described. The alternatives are intended to be included within the scope of the invention.

The invention claimed is:

1. A system for calibrating a radiation imaging device having a radiation source and a radiation beam comprising:
    a variable thickness filter comprising multiple movable plates for attenuating radiation, the multiple movable plates each having a slit formed therin for allowing the radiation to pass through a movable plate unattenuated when the movable plate is in a first position; and
    a radiation detector for measuring variations in the attenuated radiation.

2. The system of claim 1, further comprising multiple actuators configured to move each of the multiple movable plates between the first position and a second position, the second position causing the radiation beam to be attenuated in an amount dependent on the total thickness of the movable plates in the second position.

3. The system of claim 2, the multiple actuators being configured to move each of the movable plates between the first position, a second position and a third position.

4. The system of claim 3, the third position causing the radiation beam to be attenuated in an amount that differs from the attenuation caused in the second position.

5. The system of claim 4, the difference in amount of attenuation between the second position and the third position resulting from a difference in material composition of the movable plates.

6. The system of claim 3, the movable plates located in a path of the radiation beam in the second position having a thickness and material composition that differs from the thickness and material composition of the movable plates located in a path of the radiation beam in the third position, attenuation of the radiation beam when the movable plates are in the second and third positions being approximately equal.

7. The system of claim 1, further comprising:
    a radiation beam flattening filter;
    a primary collimator;
    a beam monitoring detector; and
    a secondary collimator.

8. The system of claim 1, the multiple movable plates have thicknesses which increase incrementally by double the thickness of an immediately preceding movable plate, a first plate being one-quarter of an inch in thickness.

9. The system of claim 1, each of the multiple movable plates being formed of at least one of the following materials from the group consisting of: copper, tungsten, lead, and steel.

10. The system of claim 2, further comprising multiple rods supporting each of the multiple movable plates and moving in response to the multiple actuators.

11. The system of claim 1, the radiation source being one of an x-ray and gamma ray source.

12. The system according to claim 1, the multiple movable plates have thicknesses which can be combined to provide total thicknesses which increase incrementally by one-quarter of an inch.

13. The system according to claim 7, further including a post-collimator.

14. A method for calibrating an imaging device comprising:
    directing a radiation beam at a detector;
    passing the radiation through a variable thickness filter including multiple movable plates, the radiation remaining unattenuated when each of the multiple movable plates is in a first position achieved by aligning a slit in a movable plate with a path of the radiation beam;
    attenuating the radiation in one or more increments dependent on the total thickness of the multiple movable plates that are in a second position; and
    detecting the radiation at the detector.

15. The method of claim 14, further comprising:
    flattening the radiation beam;
    detecting the radiation beam at a beam monitoring detector; and
    collimating the radiation beam.

16. The method according to claim 14, further comprising moving each of the multiple movable plates by actuating at least one actuator.

17. The method according to claim 16, further comprising:
    moving the multiple plates to a third position within the path of the radiation beam, the radiation beam being attenuated by the multiple plates in the third position in an amount that differs from the attenuation by the multiple plates in the second position.

18. The method according to claim 16, further comprising:
    moving the multiple plates to a third position within the path of the radiation beam, the radiation beam being attenuated by the multiple plates in the third position in an amount that is approximately equal to the attenuation by the multiple plates in the second position.

19. A system for calibrating a radiation imaging device having a radiation source and a radiation beam comprising: a variable thickness filter including multiple steps and a slit through a thickest section of the variable thickness radiation filter; and
    a radiation detector for measuring variations in radiation passing through the variable thickness filter.

20. The system of claim 19, the variable thickness radiation filter including a single block of material.

21. The system of claim 19, the variable thickness filter including multiple conjoined blocks of material to form a continuous block of material.

22. The system of claim 20, the material being selected from a group consisting of copper, steel, tungsten and lead.

23. The system of claim 21, each of the multiple blocks of material being selected from a group consisting of copper, steel, tungsten and lead.

24. The system of claim 19, further comprising:
    a radiation beam flattening filter;
    a primary collimator;

a beam monitoring detector; and a secondary collimator.

25. The system according to claim 19, the radiation source being attenuated when any one of the multiple steps are in a path of the radiation beam and the radiation beam being unattenuated when the slit is aligned with the path of the radiation beam.

26. The system according to claim 19, the radiation source being one of an x-ray or gamma ray source.

27. The system according to claim 24, further including a post-collimator.

* * * * *